United States Patent [19]

Schulein

[11] 4,181,163

[45] Jan. 1, 1980

[54] COMPACT KITCHEN APPLIANCE

[75] Inventor: Rolf G. Schülein, Singhofen, Fed. Rep. of Germany

[73] Assignee: Leifheit International Gunter Leifheit GmbH, Nassau, Fed. Rep. of Germany

[21] Appl. No.: 840,173

[22] Filed: Oct. 7, 1977

[30] Foreign Application Priority Data

Oct. 7, 1976 [DE] Fed. Rep. of Germany ....... 2645247

[51] Int. Cl.² .............................................. B65B 3/06
[52] U.S. Cl. .................................. 141/381; 150/52 R; 241/82.7
[58] Field of Search ............... 150/52 R; 141/98, 379, 141/380, 381, 112; 220/212, 85 R; 241/82.1–82.7

[56] References Cited

U.S. PATENT DOCUMENTS

| 875,497 | 12/1907 | Bokay | 141/381 |
|---|---|---|---|
| 2,380,364 | 7/1945 | Marshall | 241/82.5 |
| 2,779,369 | 1/1957 | Biro | 241/82.5 |
| 2,815,047 | 12/1957 | Howard | 141/379 X |

*Primary Examiner*—Frederick R. Schmidt

*Attorney, Agent, or Firm*—Striker, Michael J.

[57] ABSTRACT

A kitchen appliance, such as a meat grinder, a vegetable slicer, or the like, includes a housing which has a protrusion on its front side, such protrusion constituting an outlet through which a processed food emerges from the interior of the housing to its exterior. A cover is mounted on the housing in a protective position in which it covers the front surface of the housing in its entirety, including the protrusion. The housing has a base which rests on a support surface and has an extension projecting forwardly beyond the front surface of the housing proper and the cover has a circumferential wall formed with a cutout in which the extension of the base is accommodated in the protective position of the cover. The cover is usable as a receiving container for the processed food emerging from the protrusion of the housing. In the latter instance, it assumes an extended position in which it is supported on the support surface and a depression thereof receives the extension of the base. The circumferential walls overlap and surround the corresponding walls of the housing in the protective position, and one of them is received in a groove of the front side of the housing in the extended position, for attaching the cover to the housing.

8 Claims, 2 Drawing Figures

COMPACT KITCHEN APPLIANCE

BACKGROUND OF THE INVENTION

The present invention relates to a kitchen appliance, and more particularly to a meat grinder, vegetable slicer and the like.

Kitchen appliances of this type are already known and being widely used. Usually, such appliances respectively include a housing which accommodates tools or the like within it, the lower side of the housing being configurated as a base by means of which the entire housing is supported on and connected to a working plate at a support surface of the latter, the housing further having at its upper side a filling opening or hopper for the introduction of the food to be processed into the interior of the housing. Furthermore, the housing has a protrusion at its front side and extending frontwardly thereof, which protrusion accommodates the front end of a substantially horizontally extending tool element, the forwardly facing free end portions of the housing protrusion having at least one discharge opening through which the processed food emerges from the interior of the housing to its exterior. As a result of the presence of the protrusion of the housing which extends frontwardly beyond the front side of the housing, these conventional kitchen appliances possess an uneven front side. During the time period for which the appliance is being stored between two consecutive uses thereof, dust or dirt may deposit on this uneven front side of the housing of the kitchen appliance, and it is not easy to remove the accumulated dust or dirt, exactly because of the uneven configuration of the front face of the housing from which the protrusion accommodating the front end of the tool element projects frontwardly. In addition thereto, the uneven front surface of the housing which, incidentally, also detracts from the aesthetic appeal and appearance of the housing, causes difficulties when it is desired or necessary to package or wrap the kitchen appliance.

SUMMARY OF THE INVENTION

Accordingly, it is a general object of the present invention to avoid the disadvantages of the prior art.

More particularly, it is an object of the present invention to so construct a kitchen appliance of the type here under consideration as not to be possessed of the disadvantages of the prior-art kitchen appliances of the same type.

Still another object of the present invention is to so design the kitchen appliances that it has such an outer outline that, in the first place, no substantial amounts of dirt or dust will be permitted to accumulate on the housing during the storage of the kitchen appliance and that whatever amounts to accumulate on the housing during such storage are easily removable.

A concomitant object of the present invention is to so devise a kitchen appliance of the above type as to be simple in construction, inexpensive to manufacture and reliable nevertheless.

A still other object of the present invention is to develop a kitchen appliance which, when in its storage condition, has an uncomplicated outer contour, thus lending itself excellently for packaging in boxes or the like.

In pursuance of these objects and others which will become apparent hereafter, one feature of the present invention resides, briefly stated, in a kitchen appliance, particularly a meat grinder, a vegetable slicer and the like, which comprises a housing having a base for supporting the appliance, a front face, and a protrusion extending frontwardly from the front face; and means for protecting the protrusion, including a cover adapted to be mounted on the housing at least in protective position in which it covers the protrusion and also the front face in its entirety. By resorting to the use of the generally cup-shaped protective cover of the present invention there is obtained the advantage that the the protrusion of the housing which extends frontwardly from the front side of the housing is concealed in a simple manner, in such a way that the entire front side of the kitchen appliance is also simultaneously hidden. Under these circumstances, the cup-shaped protective cover covers that part of the housing of the kitchen appliance which is rendered complex by the presence of the above-mentioned protrusion, so that deposition of dirt or dust on such complex front side of the kitchen appliance during the storage thereof is avoided. The cup-shaped protective cover itself has smooth walls so that these walls can be kept clean or cleaned in a very simple manner.

According to a currently preferred advantageous concept of the present invention, the housing has a generally rectangular cross-section and includes a top wall remote from the base, and a pair of lateral walls extending between the base and the top wall. Then, the cover includes one wall which constitutes a front of the appliance in the protective position of the cover and which has marginal portions, and a plurality of circumferential walls which extend from the marginal portion of the one wall and constitute extensions of the top and lateral walls in the protective position of the cover. As a result of this particular configuration of the housing and of the cover, the kitchen appliance obtains a substantially parallelepiped contour after the assumption of the protective position by the cup-shaped protective cover so that the kitchen appliance can now be introduced into boxes or other storage containers in an especially simple way.

The above-mentioned circumferential walls overlap and surround in the protective position of the cover the top and lateral walls of the housing at least at those zones which adjoin the front face of the housing. As a result of this expedient, it is very simple to so handle the cover as to assume the proper protective position on the housing of the kitchen appliance.

According to a further advantageous facet of the present invention, the top wall of the housing has a recessed region in which one of the circumferential walls of the cover is received in the protective position of the cover. In this manner, the respective circumferential wall of the cover is reliably received in the recessed region of the top wall of the housing so that the kitchen appliance has a smooth upper surface when the protective cover assumes its protective position on the housing.

It is further proposed, in accordance with a further advantageous feature of the present invention, for the above-mentioned one wall of the cover to support the cover in an extended position thereof in which a portion of the cover is situated underneath the protrusion for the cover to serve as a receiving container for materials emerging from the protrusion during the operation of the appliance. Advantageously, the one wall of the cover supports the latter on the same support surface on which the base of the kitchen appliance is being supported. Thus, the cup-shaped protective cover which is used for the concealment of and protection of the complex front side of the housing, is also intermittently reusable as a receiving container for the processed food.

The cup-shaped protective cover which overlaps the entire front side of the housing of the kitchen appliance is provided with a cutout in one of the circumferential walls which is below in the protective position of the cover; a projection of the base which extends frontwardly beyond the front face of the housing is then accommodated in such a cutout. As a result of this, the housing of the kitchen appliance obtains a stability which is sufficient for the intended use, and the manipulation of the protective cover is not detrimentally influenced.

The frontwardly extended projection of the base advantageously has an upper surface which slopes downwardly in the frontward direction of the projection. Then, the above-mentioned one wall of the cover which serves as front of the appliance in the protective position has a depression in which the projection of the base is received in the extended position of the cover. In this manner, the cup-shaped protective cover, while being used as a receiving container in its extended position, can be arranged so close to the housing proper that the cover abuts against the front side of the housing.

According to a further advantageous facet of the present invention, the housing has at least one receiving groove at the front face thereof, the one circumferential wall of the cover which is below in the protective position of the cover having at least one border region next to the cutout and at least partially received in the groove in the extended position of the cover. Advantageously, the front face of the housing has a bulge thereon and the bulge bounds the groove together with the front face and with the upper surface of the projection of the base. This expedient renders it possible to attach, in a very simple manner, the cup-shaped protective cover to the housing of the kitchen appliance in the extended position of the cover.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
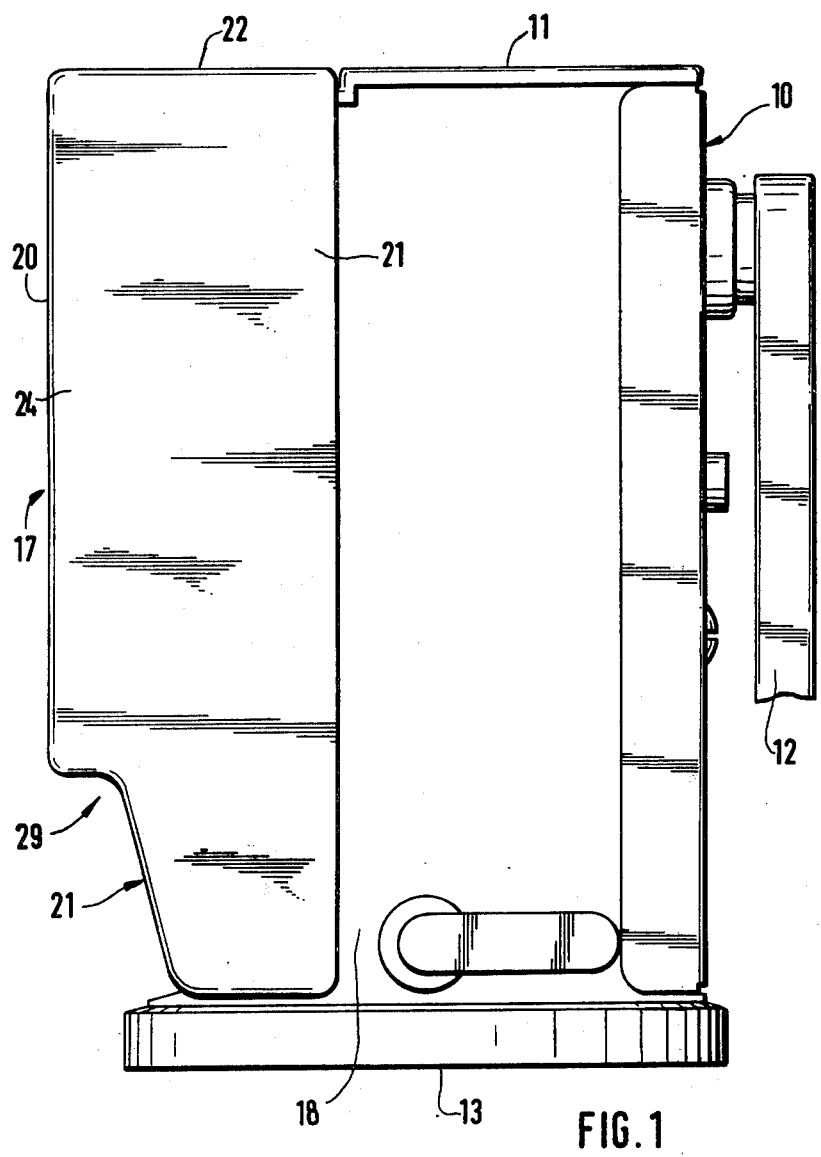
FIG. 1 is a side elevational view of the kitchen appliance according to the present invention with a cover in its protective position.

Referring now to the drawing in detail, it may be seen that the present invention has been illustrated as being embodied in a meat grinder. The meat grinder or a similar kitchen appliance includes a housing 10 which is equipped with a filling opening or hopper 11. A non-illustrated conventional tool is accommodated within the housing 10 underneath the filling hopper 11, the non-illustrated tool being rotated by means of a crank 12. For the sake of simplicity and clarity, only a part of the lever portion of the crank 12 has been illustrated in the drawing.

The housing 10 is provided with a base 13 arranged at the lower side of the housing 10, the base 13 serving to rest the kitchen appliance, and possibly also connect the same, to a support surface of a working zone. A protrusion 15 extends frontwardly from the front side 14 of the housing 10, the protrusion 15 accommodating the front end of the tool element accommodated in the housing 10 and mounted therein for rotation about a substantially horizontal axis. The forwardly facing free end face 16 of the protrusion 15 is provided with at least one conventional and thus not illustrated discharge opening for the processed food.

The protrusion 15 which extends frontwardly beyond the front side 14 of the erected housing 10 can be covered by a cup-shaped protective cover 17 which is or can be supported on the housing 10 and conceals the entire front face 14 of the housing 10 when it assumes a protective position thereof which is illustrated in FIG. 1. The upright housing 10 has a substantially parallelepiped configuration. The lateral walls 18 and the upper wall 19 of the housing 10 are extended frontwardly by circumferential walls 21 and 22 of the cup-shaped cover 17 which extend toward and are connected to a major wall 20 which, in the illustrated protective position of FIG. 1, constitutes the front of the non-operative kitchen appliance. As a result of the presence of the housing protrusion 15 at the front side 14 of the housing 10, the housing 10 of the kitchen appliance has a complex contour, especially at the front side 14 thereof so that dust or dirt would tend to accumulate at least at the more complex parts of the housing 10. Because of the complexity of the shape of the housing 10, the dirt, once depositing, will be very difficult to remove. On the other hand, when the housing protrusion 15 is hidden underneath the cup-shaped protective cover 17, the kitchen appliance a close appearance so that there is no longer any need for worry that any complex-contour portions of the appliance could become soiled. On the other hand, the smooth-surface walls of the housing 10 and of the cup-shaped protective cover 17 can be kept clean in a very simple manner. It is also possible to very easily package the kitchen appliance when the cup-shaped protective cover assumes its protective position.

As also particularly seen in FIG. 1, the lateral walls 18 and the upper wall 19 of the housing 10 are overlapped and surrounded by the corresponding walls 21, 22 of the cup-shaped protective cover 17 at the region thereof which is adjacent to the front side 14 of the housing 10. A result of this particular configuration is that the cup-shaped protective cover 17 can be very easily mounted on the housing 10. An upwardly open recess region 23 is provided in the upper wall 19 of the housing 10, and a corresponding horizontally extending circumferential wall 22 of the cup-shaped protective cover 17 is received therein in the protective position of the cover 17. As a result of this, the upper surfaces of the housing 10 and of the cup-shaped protective cover 17 lie along and define a common plane.

Figure 2:
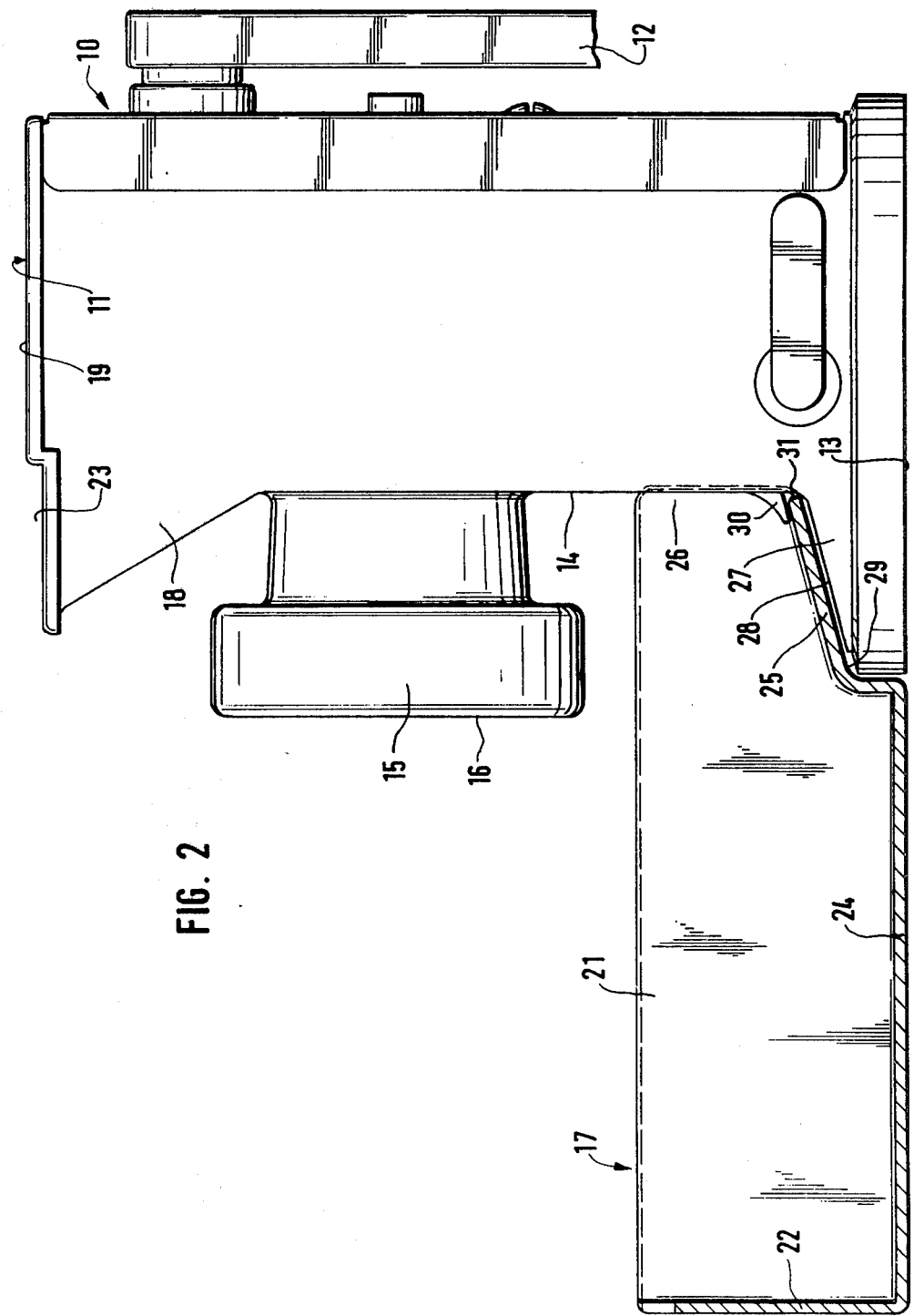
FIG. 2 is a view similar to FIG. 1 but with the protective cover in its extended position in which it serves as a receiving container for the processed food from the appliance.

The front 20 of the major wall 24 of the cup-shaped protective cover 17, when in its extended position illustrated in FIG. 2, faces downwardly and is supported on a working plate or a similar support surface. When thus positioned, the cup-shaped protective cover is usable as a receiving receptacle for the processed food which is being discharged from the protrusion 15 of the housing 10 of the appliance. The cup-shaped protective cover 17 which covers the entire front side 14 of the housing 10 when it assumes the protective position illustrated in FIG. 1 is provided with a cutout 26 in one circumferential wall 25 in which a frontwardly extending projection 27 of the base 13 of the housing 10 is accommodated. The projection 27 which constitutes a frontwardly oriented extension of the base 13 of the housing 10 has an upper surface 28 which is inclined downwardly in the frontward direction of the housing 10. The cup-shaped protective cover 17 is provided with a correspondingly configurated depression 29 in which the projection 27 is received when the cup-shaped protective cover 17 is being used as a receiving container for the processed food emerging from the protrusion 15 of the housing 10, assuming the position illustrated in FIG. 2.

A groove 31 is provided at the front side 14 of the housing 10, being delimited by the upper surface 28 of the projection 27 of the base 13, by the front side 14 itself, and by a rib 30 which is rigid with the front side 14 of the housing and extends frontwardly therefrom. When the cup-shaped protective cover 17 is being used as a receiving container, a free edge of the circumferential wall 25 formed with the depression 29 is then received in the groove 31. In this manner, the cup-shaped protective cover 17 is mounted on the housing 10 and connected thereto when it is in its extended position, illustrated in FIG. 2, that is, when it is being used as a receiving container for the processed food.

It will be understood that each of the elements described above, or two or more together, may also find a useful application in other types of constructions differing from the types described above.

While the invention has been illustrated and described as embodied in a meat grinder, it is not intended to be limited to the details shown, since various modifications and structural changes may be made without departing in any way from the spirit of the present invention. So, for instance, the kitchen appliance could be, rather than the above-discussed meat grinder, a vegetable slicer or a similar appliance.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A kitchen appliance, particularly, a meat grinder, vegetable slicer and the like, comprising a housing of a generally rectangular cross section having a base for supporting the appliance, a top wall remote from said base, a pair of lateral walls extending between said base and said top wall, a front face, and a protrusion extending frontwardly from said front face; a cover adapted to be mounted on said housing in a protective position in which it covers said protrusion and also said front face in its entirety, said cover including one wall which constitutes a front of the appliance in said protective position of said cover and which has marginal portions, and a plurality of circumferential walls which extend from said marginal portions of said one wall, said one wall being flat so that in said protective position no substantial amount of dirt or dust is accumulated on said housing during the storage of the kitchen appliance and that whatever amounts do accumulate on said housing during such storage are easily removable, on the one hand, and the kitchen appliance is easy and convenient for packaging, on the other hand, said one wall which constitutes a front of the appliance in said protective position of said cover and said circumferential walls which extend from said marginal portions of said one wall constituting extensions of said top and lateral walls in said protective position of said cover, said cover being detachably connectable with said housing in an extended position in which said cover is supported on said one wall and situated underneath said protrusion for said cover to serve as a receiving container for materials emerging from said protrusion during the operation of the appliance; and means for detachably connecting said cover with said housing in said extended position and including interengaging formations provided in said cover and said housing, said interengaging formation including projection formed on said base and extending frontwardly beyond said front face, and a depression formed in said one wall of said cover in which depression said projection of said base is received in said extended position of said cover.

2. An appliance as defined in claim 1, wherein said circumferential walls overlap and surround in said protective position of said cover said top and lateral walls of said housing at least at those zones which adjoin said front face of said housing.

3. An appliance as defined in claim 1, wherein said top wall has a recessed region in which one of said circumferential walls of said cover is received in said protective position of said cover.

4. An appliance as defined in claim 1, wherein one of said circumferential walls of said cover has a cutout therein in which said projection of said base is accommodated in said protective position of said cover.

5. An appliance as defined in claim 1, wherein said projection which extends frontwardly beyond said front face has an upper surface which slopes downwardly in the frontward direction of said projection.

6. An appliance as defined in claim 5, wherein said interengaging formations further including at least one receiving groove at said front face of said housing, and at least one border region of said one circumferential wall of said cover which is next to said cutout and at least partially received in said groove in said extended position of said cover.

7. An appliance as defined in claim 6, wherein said front face of said housing has a bulge thereon; and wherein said bulge bounds said groove together with said front face and with said upper surface of said projection of said base.

8. A kitchen appliance, particularly, a meat grinder, a vegetable slicer and the like, comprising a housing of a generally rectangular cross section and having a base for supporting the appliance, a top wall remote from said base, a pair of lateral walls extending between said base and said top wall, a front face, and a protrusion extending frontwardly from said front face; a cover adapted to be mounted on said housing in a protective position in which it covers said protrusion and also said front face in its entirety, said cover including one wall which constitutes a front of the appliance in said protective position of said cover and which has marginal portions, and a plurality of circumferential walls which extend from said marginal portions of said one wall, said one wall being flat so that in said protective position no substantial amount of dirt or dust is accumulated on said housing during the storage of the kitchen appliance and that whatever amounts do accumulate on said housing during such storage are easily removable, on the one hand, and the kitchen appliance is easy and convenient for packaging, on the other hand, said one wall which constitutes a front of the appliance in said protective position of said cover and said circumferential walls which extend from said marginal portions of said one wall constituting extensions of said top and lateral walls in said protective position of said cover, said cover being detachably connectable with said housing in an extended position in which said cover is supported on said one wall and situated underneath said protrusion for said cover to serve as a receiving container for materials emerging from said protrusion during the operation of the appliance; and means for detachably connecting said cover with said housing in said extended position and including interengaging formations provided in said cover and said housing, said interengaging formations including a projection formed on said base and extending frontwardly beyond said front face and having an upper surface which slopes downwardly in the frontward direction of said projection, and a depression formed in said one wall of said cover in which depression said projection of said base is received in said extended position of said cover.

* * * * *